United States Patent

[11] 3,568,582

[72] Inventors Yasuo Uchida;
 Hideo Akimoto, Tokyo, Japan
[21] Appl. No. 758,920
[22] Filed Sept. 10, 1968
[45] Patented Mar. 9, 1971
[73] Assignee Konishiroku Photo Industry Co., Ltd.
 Tokyo, Japan
[32] Priority Sept. 27, 1967
[33] Japan
[31] 42/62101

[54] ELECTRONIC SHUTTER
 6 Claims, 1 Drawing Fig.
[52] U.S. Cl............................................... 95/11.5,
 95/10, 250/205, 315/151, 315/241, 315/340
[51] Int. Cl..................................................... G03b 9/62,
 G03b 9/70
[50] Field of Search......................................... 95/11.5, 10
 (C); 315/240 (Inquired), 241, 241 (P), 232

[56] References Cited
 UNITED STATES PATENTS

| | | | |
|---|---|---|---|
| 3,033,988 | 5/1962 | Edgerton...................... | 315/241X |
| 3,122,677 | 2/1964 | Flieder......................... | 315/241 |
| 3,156,827 | 11/1964 | Porteous et al............... | 315/241X |
| 3,312,086 | 4/1967 | Casebeer et al. ............. | 95/11.5X |
| 3,350,603 | 10/1967 | Erickson ...................... | 315/241X |
| 3,460,450 | 8/1969 | Ogihara........................ | 95/10 |

Primary Examiner—John M. Horan
Assistant Examiner—M. L. Gellner
Attorney—Arnold Robinson

ABSTRACT: An electronic shutter comprising a time control circuit for maintaining the shutter open for a variable period of time inversely related to the intensity of the light reflected from the subject and sensed at the camera, a flash discharge circuit which initiates illumination upon opening of the shutter, and a flash control circuit operative to cause said flash discharge circuit to cease illumination when the timing control circuit generates a shutter-closing signal.

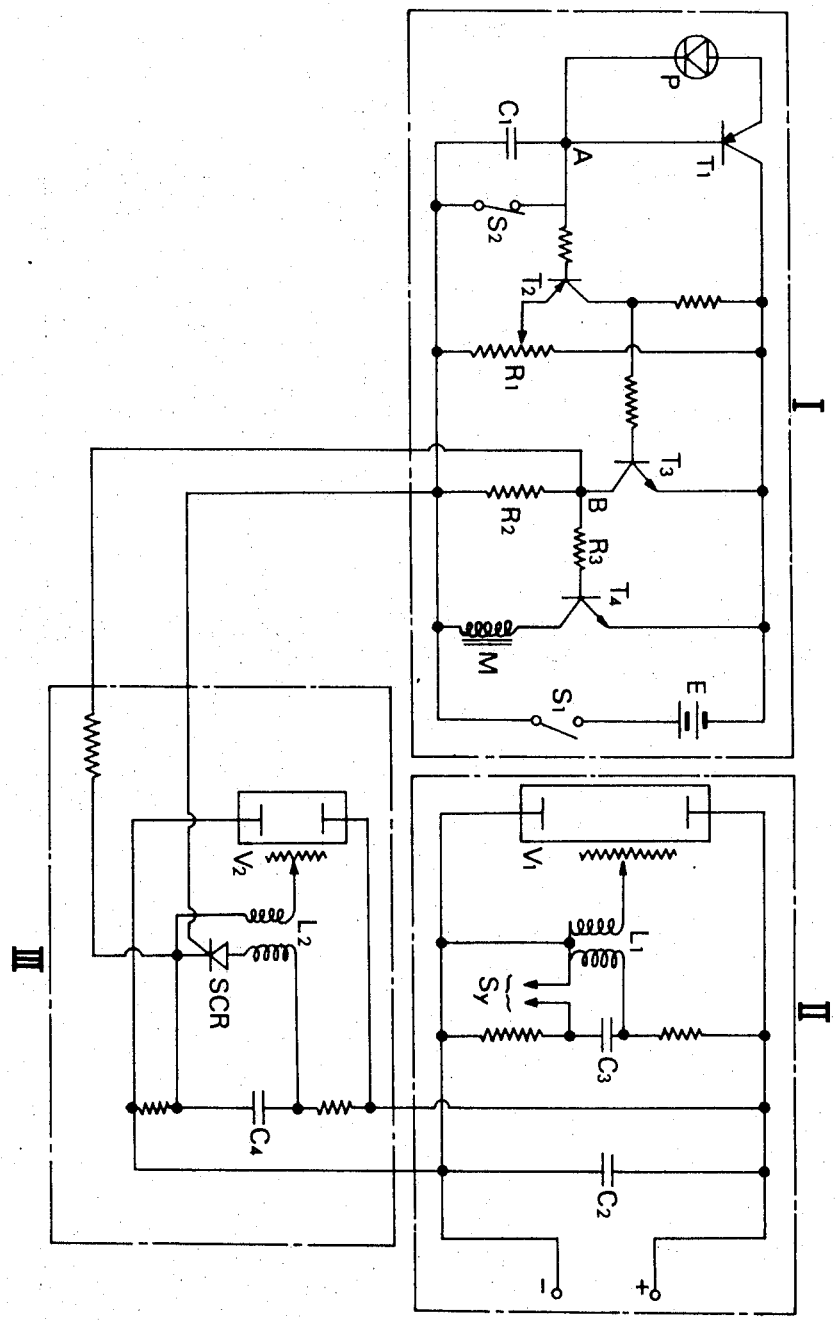

ELECTRONIC SHUTTER

This invention relates to an electronic shutter for photographic camera, and particularly to such electronic shutter of the type having a time control circuit which incorporates a photovoltaic cell energized by light reflected from an object to be photographed as an input thereto and after integration of such input, produces a triggering signal to close shutter blades.

Various forms of time control circuits are known, including a time constant circuit which incorporates a photoconductor. Known disadvantage of such photoconductor is its slow response to light and the resulting circuit fails to follow exactly rapid variation of light as occurring in flashlight photograph, thereby causing an overexposure. to This disadvantage can be avoided with an electronic shutter as disclosed in a pending patent application Ser. No. 699,891, filed Jan. 23, 1968, wherein a photovoltaic cell which has a high speed of response to light is connected across the base and emitter of a grounded-base transistor. Current flow in the collector path of the transistor is proportional to the output current of the photovoltaic cell, so that a capacitor connected in the collector path can be charged to a predetermined voltage over a time period which determines the exposure time. When the predetermined voltage is reached, a trigger signal is produced to deenergize an electromagnet for releasing the shutter blades to return to their closed position.

One difficulty with the electronic shutter just described is the limited speed at which shutter blades can move. Usually, the maximum speed available in a between lens shutter will be in the order of 1/300 to 1/500 of a second, even though the circuit involving the photovoltaic cell can provide a trigger signal as early as within a millisecond. Thus the speed limitation is mainly due to the mechanical time lag from the deenergization of the electromagnet to the closure of the shutter blades.

Therefore, it is an object of the invention to overcome the existing speed limitation by providing an electronic shutter of the type described in which the time lag inherent to the motion of mechanical parts is eliminated.

It has also been proposed in controlling the radiation from a discharge tube to bypass the current flow through the tube when a predetermined radiation quantity has been reached. The unit includes a phototube which is directly irradiated from the tube for detection of light energy. When such unit is applied to the control of correct exposure in the flashlight photography, difficulties arise when several separate light sources and/or bounce light technique are used to achieve a desired illumination for an object to be photographed. Thus several light detectors will be associated with or irradiated from individual light sources so that the flash from the respective light sources will terminate differently in time and correct control of exposure cannot be obtained. Also it is difficult to control the effect of bounce light.

Thus one important factor involved with the utility of an electronic shutter is its versatility to control correct exposure under various kinds of illuminations or their combination. Often there occurs the necessity to supplement additional amount of radiation from different sources such as natural light, when using an illumination provided by a flash discharge tube, because of its relatively short duration of radiation.

Therefore, it is another object of the invention to provide an electronic shutter of the type described which includes the photovoltaic cell as sole light detector at the camera position and is adapted to be operated by the sum of total light inputs.

According to the invention, there is provided an electronic shutter for photographic camera having a time control circuit which incorporates a photovoltaic cell placed in the camera casing so as to be energized by light reflected from an object to be photographed for producing a photocurrent to charge a capacitor to a predetermined voltage, whereupon a trigger signal is produced to close shutter blades, and which is characterized in that said trigger signal is used to turn on a semiconductor switching element, thereby bypassing the current flow in a flash discharge tube used for exposure.

The invention will be described in further detail with reference to the drawing which shows the wiring diagram of one embodiment of the invention.

Referring to the single drawing, the apparatus shown includes a time control circuit I, a flash discharge circuit II and a flash control circuit III. The arrangement of the time control circuit is fully described in the pending application Ser. No. 699,891, filed Jan. 23, 1968, and for the present purpose it will be sufficient to note that a photovoltaic cell P is connected across the base and emitter of a grounded-base PNP transistor $T_1$ and when exposed to reflected light from an object to be photographed, drives the transistor so that a capacitor $C_1$ is charged from a DC supply E in a manner such that the voltage thereacross represents a time integral of the light input to the cell. To this end, the collector path of the transistor $T_1$ includes a switch $S_1$ in series with the DC supply and the capacitor, the latter being normally short circuited by another switch $S_2$. These switches are associated with the shutter release of a photographic camera and the arrangement is such that as the shutter release is operated, the switch $S_1$ is closed first, shutter blades then start to open, the switch $S_2$ is opened and synchronizing contacts $S_y$ contained in the flash discharge circuit are closed. When the switch $S_1$ is closed, current flows from the supply E through resistors $R_2$ and $R_3$ to the base of an NPN transistor $T_4$ having its collector connected through an electromagnet M and the switch $S_1$ to the positive terminal of the supply and its emitter connected to the negative terminal of the supply. Thus the transistor $T_4$ is biased forwardly into conduction, and the electromagnet is energized to keep the shutter blades open. In the circuit shown, a PNP transistor $T_2$ acts as a triggering stage. Thus, it has its emitter connected to a movable point on an adjustable resistor $R_1$ which is connected across the supply in series with the switch $S_1$, its base connected through a resistor to the point A which is connected to one plate of the capacitor $C_1$, and its collector connected through a resistor to the negative terminal of the supply. The collector of the transistor $T_2$ is also connected through a resistor to the base of an NPN transistor $T_3$ which has its collector connected to the junction between resistors $R_2$ and $R_3$ and its emitter connected to the negative terminal of the supply. As the capacitor $C_1$ charges to a predetermined voltage, the transistor $T_2$ is forwardly biased and conducts to provide a trigger pulse which is applied to the base of the transistor $T_3$, thereby turning it on. Then current supply to the base of the transistor $T_4$ is diverted through the collector-emitter path of the transistor $T_3$, whereby the electromagnet M is deenergized to release the shutter blades.

The flash discharge circuit II includes a flash discharge tube $V_1$ which is connected across a storage capacitor $C_2$. A DC source is connected across a pair of terminals designated by symbols + and −, respectively, and charges the storage capacitor $C_2$ and a capacitor $C_3$, the latter being in a series circuit including a pair of resistors that is connected in parallel with the capacitor $C_2$. The primary winding of a trigger transformer $L_1$ has its one end connected with one plate of the capacitor $C_3$ and its other end connected together with one end of the secondary winding to the negative terminal of the source, the other end of the secondary winding being connected to the control electrode of the tube $V_1$. Said other end of the primary winding and the other plate of the capacitor $C_3$ are connected to synchronizing contacts $S_y$.

Across the pair of terminals is also connected the flash control circuit III which has a generally similar construction to the flash discharge circuit II. However, in this instance, the primary winding of a trigger transformer $L_2$ is connected across a capacitor $C_4$ in series with the anode-cathode path of a silicon controlled rectifier designated as SCR and the secondary winding of the transformer has its one end connected to the cathode of SCR. The cathode of the controlled rectifier is also connected through a resistor to the junction B, connected to the collector of the transistor $T_3$ in the time control circuit, between the resistors $R_2$ and $R_3$. In addition, the gate of the controlled rectifier is connected to the positive supply terminal through the normally open switch $S_2$. It will be appreciated that the capacitor $C_4$ is charged by the DC source connected across the pair of terminals.

The device operates as follows:

When the shutter release is operated, the switch $S_1$ closes and the switch $S_2$ opens. At the same time, the shutter blades start to open and are held open by the electromagnet M which is energized through the closed switch $S_1$ and conducting transistor $T_4$. As the release is operated, the synchronizing contacts $S_y$ are closed, whereupon the capacitor $C_3$ discharges through the primary winding of the trigger transformer $L_1$, in the secondary winding of which is induced a voltage pulse to trigger the flash discharge tube into a discharge condition. The electric energy stored in the capacitor $C_2$ now discharges through the tube $V_1$ to emit a flash of light energy. A part of the light energy reflected from an object to be photographed impinges upon the photovoltaic cell P, which produces a photocurrent to drive the transistor $T_1$. Because of the grounded base configuration of this transistor, current flow in its collector path is proportional in magnitude to the photocurrent so that linearity is maintained between the light input and the collector current which charges the integrating capacitor $C_1$. When the capacitor $C_1$ charges to a predetermined voltage as determined by the setting of the resistor $R_1$, the transistor $T_2$ is turned on to provide a trigger signal. This signal turns the transistor $T_3$ on, so that the potential at the point B falls toward the potential of the negative supply terminal. As soon as the switch $S_1$ closes, the gate of SCR in the flash control circuit is biased positively with respect to its cathode, but the resistance of the resistors $R_2$ and $R_3$ is chosen so that such bias is insufficient to cause conduction of the controlled rectifier. However, when the transistor $T_3$ conducts, the fall of potential at the point B becomes great enough to bias SCR into conduction, thereby causing the charged capacitor $C_4$ to discharge through SCR. The resulting current flow in the primary winding of the transformer $L_2$ induces a voltage pulse across its secondary winding, thereby causing the tube $V_2$ to discharge. The discharge tubes $V_1$ and $V_2$ are chosen so that $V_2$ has a substantially lower impedance than $V_1$ and once the tube $V_2$ has started to discharge, the current flow in the tube $V_1$ is effectively bypassed. Thus the flash of light energy from the discharge tube $V_1$ terminates when the capacitor $C_1$ has charged to the predetermined voltage. The exposure time can be properly determined by setting the resistor $R_1$ in dependence upon the sensitivity of film used. When the potential at the point B falls, the transistor $T_4$ is rendered nonconductive and the electromagnet M deenergized. Because the flash of light terminates at the instant when the potential at the point B falls, mechanical time lag involved with the returning motion of the shutter blades upon deenergization of the electromagnet has no influence upon the exposure of the film. With the arrangement shown, the flash control circuit can bypass the main discharge tube $V_1$ within 20 or 30 microseconds since the fall of the potential at the point B.

The device can be mounted in any convenient manner. The time control circuit including the photovoltaic cell may be located within a camera casing, and the flash discharge circuit and the flash control circuit may be constructed as a compact unit adapted to be plugged in a suitable socket on the camera for connection with the time control circuit. With such arrangement, the camera can be used without the flash discharge unit for taking pictures in natural light or flashlight from a flashbulb. Alternatively, both the time control circuit and the flash control circuit may be housed in the camera casing or all of the circuits I to III may be located in the camera casing. However, it is essential that the photovoltaic cell be disposed in the camera casing so that when several separate light sources are used to illuminate an object to be photographed in a desired manner, the cell senses the sum of light from all the sources as reflected from the object. The detection of reflected light from the object at the camera position provides versatility in applying various manners of illumination. It will also be noted that when the radiation from the tube $V_1$ is insufficient to give the required exposure, the trigger signal is not produced when the capacitor $C_3$ has discharged so that the electromagnet M continues to be energized, thereby keeping the shutter blades open to allow additional exposure. Such arrangement is often found advantageous.

In order to provide for adjustment of the time control circuit in accordance with the aperture of diaphragm associated with the objective of the camera, a separate diaphragm may be disposed before the photovoltaic cell and controlled by interlocked operation with the diaphragm of the objective.

While the invention has been described with reference to a particular embodiment illustrated, it should be obvious that various modifications can be made within the scope of the invention. Thus both the flash discharge circuit and the flash control circuit can take various forms, and the only requirement according to the invention is that a main discharge tube which provides a flash of light energy to an object to be photographed is caused to start discharge when film exposure is required, and is bypassed by a signal from a time control circuit which incorporates a photovoltaic cell that is exposed to reflected light from the object. While silicon controlled rectifier has been illustrated as a semiconductor switching element, it will be apparent that any semiconductor trigger device can be used without substantial modification.

I claim:

1. The combination with a camera including a shutter and a shutter release mechanism of:
   1. first circuit means for controlling the period of time said shutter is open according to a plurality of variables including the intensity of light reflected from the subject, said first circuit means including a switch controlled by the shutter release mechanism;
   2. second circuit means for providing illumination of the subject for a variable period of time beginning substantially simultaneously with the closing of said switch of said first circuit means; and
   3. third circuit means controlled by a shutter-closing signal from said first circuit means and operative in response thereto to cause said second circuit means to cease illumination of the subject.

2. The combination according to claim 1 wherein said first circuit means includes a charging circuit comprising:
   1. a first transistor;
   2. a photovoltaic cell connected across the emitter-base junction of said first transistor; and
   3. a capacitance connected in series with the collector-base junction of said first transistor; whereby the shutter is maintained open for the period of time required for said capacitance to charge to a predetermined level.

3. The combination according to claim 1 wherein said second circuit means comprises:
   1. a flash discharge tube having a control electrode and first and second load current electrodes;
   2. a first normally charged capacitance connected across said first and second load current electrodes; and
   3. a triggering circuit comprising a pulse transformer having a primary and secondary windings, said primary winding being connected in series with a normally open switch and a second normally charged capacitance, said normally open switch being closed substantially simultaneously with the closing of said switch of said first circuit means to initiate illumination of the subject by said second circuit means substantially simultaneously with the opening of the shutter by inducing a triggering pulse in said secondary winding which is connected to said control electrode.

4. The combination according to claim 1 wherein said third circuit means includes a normally nonconductive semiconductor switch having anode, cathode and gate electrodes, said cathode and gate electrodes being connected to said first circuit means for application of bias and triggering signals thereto.

5. The combination according to claim 4 wherein said bias signal is applied across said gate and cathode electrodes when the shutter is opened by closing said switch of said first circuit means, and said triggering signal is applied across said gate and cathode electrodes when said shutter-closing signal is generated by said first circuit means.

6. The combination according to claim 4 wherein said semiconductor switching means controls a discharge path for a third normally charged capacitance through the primary winding of a second pulse transformer, the secondary winding of which controls a low-impedance discharge tube.